United States Patent [19]

Ohtuka et al.

[11] 4,216,841
[45] Aug. 12, 1980

[54] STEERING POWER CONTROL DEVICE FOR POWER STEERING

[75] Inventors: Tadao Ohtuka, Saitama; Takeshi Ohe, Higashimatsuyama; Kunihiro Hamano, Tokigawa, all of Japan

[73] Assignee: Jidosha Kika Co., Ltd., Tokyo, Japan

[21] Appl. No.: 941,074

[22] Filed: Sep. 11, 1978

[51] Int. Cl.³ ............................................. B62D 5/08
[52] U.S. Cl. .................................................. 180/141
[58] Field of Search ....................... 180/141, 142, 143; 91/375 A

[56] References Cited

U.S. PATENT DOCUMENTS

| 3,583,515 | 6/1971 | Schwenk | 180/141 |
| 4,119,172 | 10/1978 | Yanagishama | 180/141 |

FOREIGN PATENT DOCUMENTS

2401950  7/1974  Fed. Rep. of Germany ........... 180/141

Primary Examiner—John J. Love
Assistant Examiner—Randall A. Schrecengost
Attorney, Agent, or Firm—Blanchard, Flynn, Thiel, Boutell & Tanis

[57] ABSTRACT

A steering power control device for a power steering system which device is provided with a sensing means which detects the weight of a load carried on a vehicle and a flow control valve which regulates the flow rate of a hydraulic fluid that is supplied to the power steering in response to the detected load, thereby reducing the necessary force to operate the steering wheel when the vehicle load is large. Further, the flow control valve can be regulated also by the output of a vehicle speed sensing means. With the controlling factors of both the vehicle load and the vehicle speed, the operation of the steering wheel is made light when the vehicle speed is low and the vehicle load is large, while the operation of the steering wheel meets with a proper resistance when the vehicle is high and the vehicle load is small, thereby stabilizing the operation of the steering wheel and giving an ideal feeling to a driver in the operation of the steering wheel.

11 Claims, 13 Drawing Figures

STEERING POWER CONTROL DEVICE FOR POWER STEERING

BACKGROUND OF THE INVENTION

This invention relates to a steering power control device for use in a power steering system. More particularly, the invention relates to a novel steering power control device which varies the steering power in response to the combined values of vehicle load and vehicle speed.

The power steering system gives an auxiliary force to the turning effort applied to a steering wheel and it facilitates the operation of the steering wheel. There are known several kinds of power steering system such as integral type, semi-integral type and linkage type systems. The linkage type power steering systems are further divided into two kinds, that is, the combined type system in which a power cylinder and a control valve are integrally formed and the separate type system in which the above two kinds of elements are formed separately. In order to give the feeling of resistance to the driver, any one of these conventional power steering systems is inevitably provided with a reaction force mechanism which transmits a reaction force to the steering wheel in response to the intensity of the steering output power. In one of the known power steering system, the intensity of the reaction force which is applied to the steering wheel is determined according to the intensity of the auxiliary force of the power steering. In this type, the intensity of the auxiliary force is regulated by the pressure or the quantity of a fluid which is introduced into the working chamber of the power steering. In other words, the larger is the pressure or the quantity of the fluid that is introduced into the working chamber, the larger becomes the ratio of the auxiliary force and the smaller becomes the reaction force to the steering wheel, accordingly.

Further, in recent years, in order to provide safety in high speed running, several kinds of pressure or flow control means have been proposed so as to increase the reaction force applied to the steering wheel with the increase of the vehicle speed even when the ratio of steering output power (ratio of auxiliary force) is the same. In any of such improvements in power steering systems, however, the speeds of the vehicles are detected so as to control the reaction forces applied to the steering wheels in response to the speeds of vehicles, and any factor other than the vehicle speed is not taken into consideration.

Therefore, in a motor truck in which the weight of a load varies greatly between a loaded state and an unloaded state, when several elements are set so as to obtain a proper steering output and a proper reaction force to a steering wheel in a loaded state, the necessary force to operate the steering wheel becomes too light in an unloaded state, especially, the driving stability in a high speed and unloaded condition becomes quite worse. To the contrary, when the several elements are set to operate satisfactorily in an unloaded state, the resistance in the steering operation during a loaded state becomes too heavy.

BRIEF SUMMARY OF THE INVENTION

In view of the above-described circumstances, the inventors of the present invention have paid attention to control of the steering output of a power steering in response to the weight of a vehicle load in order to obtain an ideal drive feeling of a vehicle with power steering, especially, of a motor truck in which the load varies greatly between a loaded state and an unloaded state.

It is, therefore, an object of the present invention to control the flow rate of a fluid which is introduced into the working chamber of a power steering system, in response to the weight of a vehicle load, thereby increasing the steering output of the power steering when the vehicle load is large.

Another object of the present invention is to provide a steering power control device which exerts a smaller reaction force to a steering wheel when the vehicle speed is low and the vehicle load is large, and exerts a larger reaction force when the vehicle speed is high and the vehicle load is small.

A further object of the present invention is to provide a steering power control device which achieves high speed stability, that is, the resistance in the operation of a steering wheel does not become too light even in an unloaded and high speed operation of a vehicle.

Still a further object of the present invention is to provide a device which enables the steering to be operated with a small force even in a loaded and low speed condition so as to prevent the driver from becoming tired.

Still a further object of the present invention is to control the flow rate of the fluid which is introduced into the working chamber of the power steering, in response to a vehicle load and a vehicle speed, thereby enlarging the ratio of the steering output of the power steering when the vehicle load is large and the vehicle speed is low.

BRIEF DESCRIPTION OF THE DRAWINGS

Other objects, features and effects of the present invention will become more apparent by reading the following detailed description of several embodiments taken in connection with the accompanying drawings, in which.

DETAILED DESCRIPTION OF THE INVENTION

Referring now to the accompanying drawings, several embodiments of the present invention will be described in detail.

Figure 1:
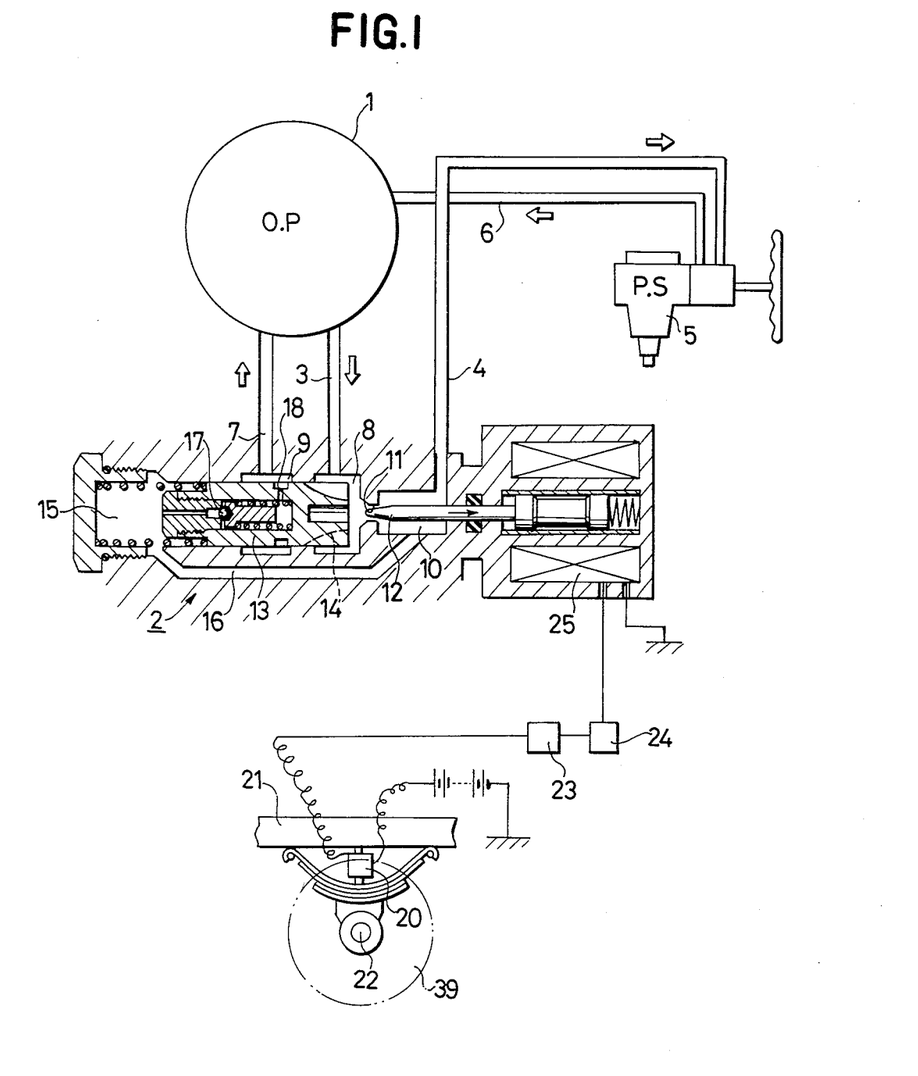
FIG. 1 is a partly cross-sectional schematic connection drawing of an embodiment of a steering power control device of the present invention, wherein the steering output is controlled in response to a vehicle load.

FIG. 1 shows a first embodiment of the present invention, in which the reference numeral 1 denotes an oil pump and 2 is a flow control valve. Hydraulic oil is supplied to the flow control valve 2 from the oil pump 1 through a line 3 and the whole or a part of the hydraulic oil is then fed into a power steering 5 by way of a line 4 and further, it is recycled into the oil pump 1 through a line 6. The excess fluid in the flow control valve 2 is returned to the oil pump 1 through another line 7.

The flow control valve 2 is provided with a chamber 8 which communicates with the line 3, a chamber 9 which communicates with the line 7 and a chamber 10 which communicates with the line 4. The cross-sectional area of an orifice 11 formed between the chambers 8 and 10, is controlled by means of a needle valve 12 which is movable longitudinally in the orifice 11. The position control of a spool valve 13 is carried out by the pressure difference between the chamber 8 and the chamber 10, thereby varying the communicating area between the chambers 8 and 9. Communicating grooves 14 are defined in the peripheral portion of one end of the spool valve 13 on the side of the chamber 8. The chamber 10 and a chamber 15 on both sides of the spool valve 13 are connected together by a communicating passage 16. Accordingly, when the needle valve 12 is inserted into the orifice 11 to a small extent, the pressure difference between the chambers 8 and 10 is small so that the spool valve 13 is shifted right (in the drawing) and the communication between the chambers 8 and 9 is almost shut off. If the passage area of the orifice 11 is reduced by inserting the needle valve 12 into the orifice 11, the pressure difference between the chambers 8 and 10, that is, the pressure difference between the chambers 8 and 15, becomes large and the spool valve 13 is shifted left (in the drawing) and the chamber 8 communicates with the chamber 9 by way of the communicating grooves 14. When this leftward shifting of the spool valve 13 is large, in other words, when the orifice 11 is throttled by the needle valve 12 to a larger extent, the area of communication between the chambers 8 and 9 becomes large. Therefore, in this flow control valve 2, when the needle valve 12 is inserted into the orifice 11 to a larger extent, the flow of the fluid that is supplied to the power steering 5 through the line 4 becomes small and the recycling to the oil pump 1 through the line 7 becomes large. The reference numeral 17 denotes a relief valve which is installed in the spool valve 13. This relief valve 17 has a function that, when the pressure in the chamber 10 is raised by some cause, the hydraulic oil therein is returned to the oil pump 1 through the communicating passage 16, the chamber 15, this relief valve 17, the orifice 18, the chamber 9 and the line 7.

A vehicle load sensor 20 is provided so as to cause the longitudinal movement of the needle valve 12 of the above-described flow control valve 2. This vehicle load sensor 20 is installed in the space between a chassis frame 21 and wheel axle 22 which supports a wheel 39 or the member integrally formed with the wheel axle 22. The load is detected by the variation in the distance between the chassis frame 21 and the wheel axle 22 and, in response to the detected value, an electrical output is generated by the load sensor 20. This output is transmitted to a solenoid 25 by way of a filter 23 and a controller 24. When the load is large, the solenoid 25 shifts the needle valve 12 by attracting it in the direction of the arrow, thereby enlarging the communicating area of the orifice 11. The filter 23 removes high-frequency components in the output of the load sensor 20 which is caused to occur when a vehicle travels on winding roads or bumpy roads, thereby preventing the needle valve 12 from fluctuation.

In the above-described device, the position of the needle valve 12 is changed in response to the weight of vehicle load so as to vary the communicating area of the orifice 11. First of all, several factors such as the position of the needle valve 12 and the diameter of the orifice 11 are determined so as to give a proper steering force in an unloaded state. That is, in the unloaded state, the communicating area of the orifice 11 is made minimum by the needle valve 12 so that the passage between the chambers 8 and 10 is made narrowest. By the action of this reduction of communicating area, the pressure in the chamber 10 and also in the chamber 15, is reduced. As a result, the spool valve 13 is shifted toward the chamber 15 and the communicating areas of the communicating grooves 14 in the peripheral portion of the spool valve 13 between the chambers 8 and 9, becomes largest. In the unloaded state, accordingly, the flow rate of hydraulic oil that is returned to the oil pump 1 through the line 7 becomes maximum and the flow ratio of hydraulic oil to the power steering 5 through the line 4 becomes minimum. Therefore, the steering output to the power steering 5 becomes minimum in the unloaded state so that the reaction force of the steering wheel becomes maximum. In the present invention, several factors are previously determined taking the above facts into consideration.

Meanwhile, in a loaded state, the vehicle load sensor 20 produces an output in response to the weight of a vehicle load and this output causes the needle valve 12 to shift in the direction of the arrow by means of the controller 24 and the solenoid 25. The communicating area of the orifice 11 is thus enlarged as compared with the unloaded state. Since the throttling action of the passage between the chambers 8 and 10 is reduced, the pressure in the chamber 10 is raised as compared with the unloaded state, and the spool valve 13 is shifted right (in the drawing), thereby reducing the communicating area of the communicating grooves 14 between the chambers 8 and 9. Accordingly, the flow rate of the hydraulic oil through the line 7 is decreased while the flow rate of the hydraulic oil to the power steering 5 through the line 4 is increased. As a result, the steering output of the power steering 5 becomes large to reduce the resistance in the operation of the steering wheel. In other words, in the loaded state, the steering output of the power steering 5 becomes large in response to the weight of a vehicle load and the resistance of the operation of the steering wheel becomes small, therefore, the required force to turn the steering wheel in the loaded state becomes the same or lighter as compared with the unloaded state.

Figure 2:
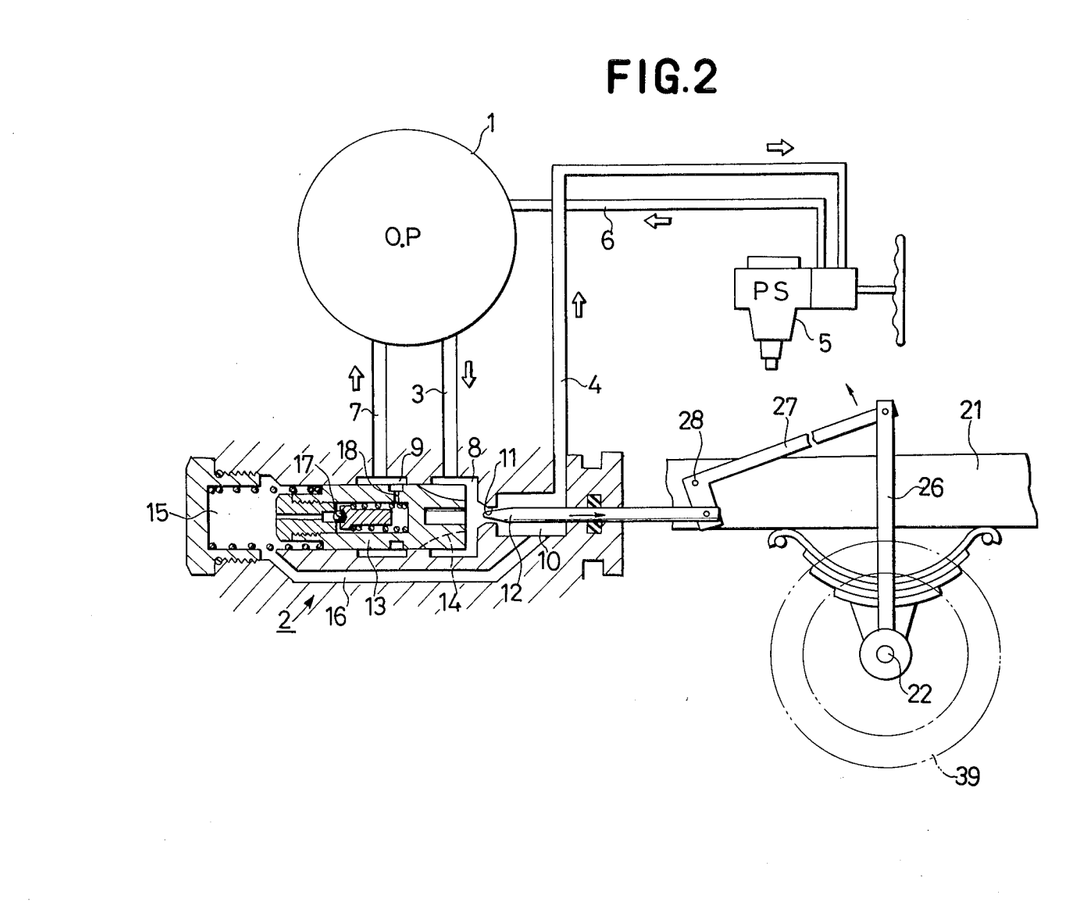
FIG. 2 and FIG. 3 are also partly cross-sectional schematic connection drawings of other embodiments of steering power control devices, respectively, like the above FIG. 1.
Figures 3, 5, 9:
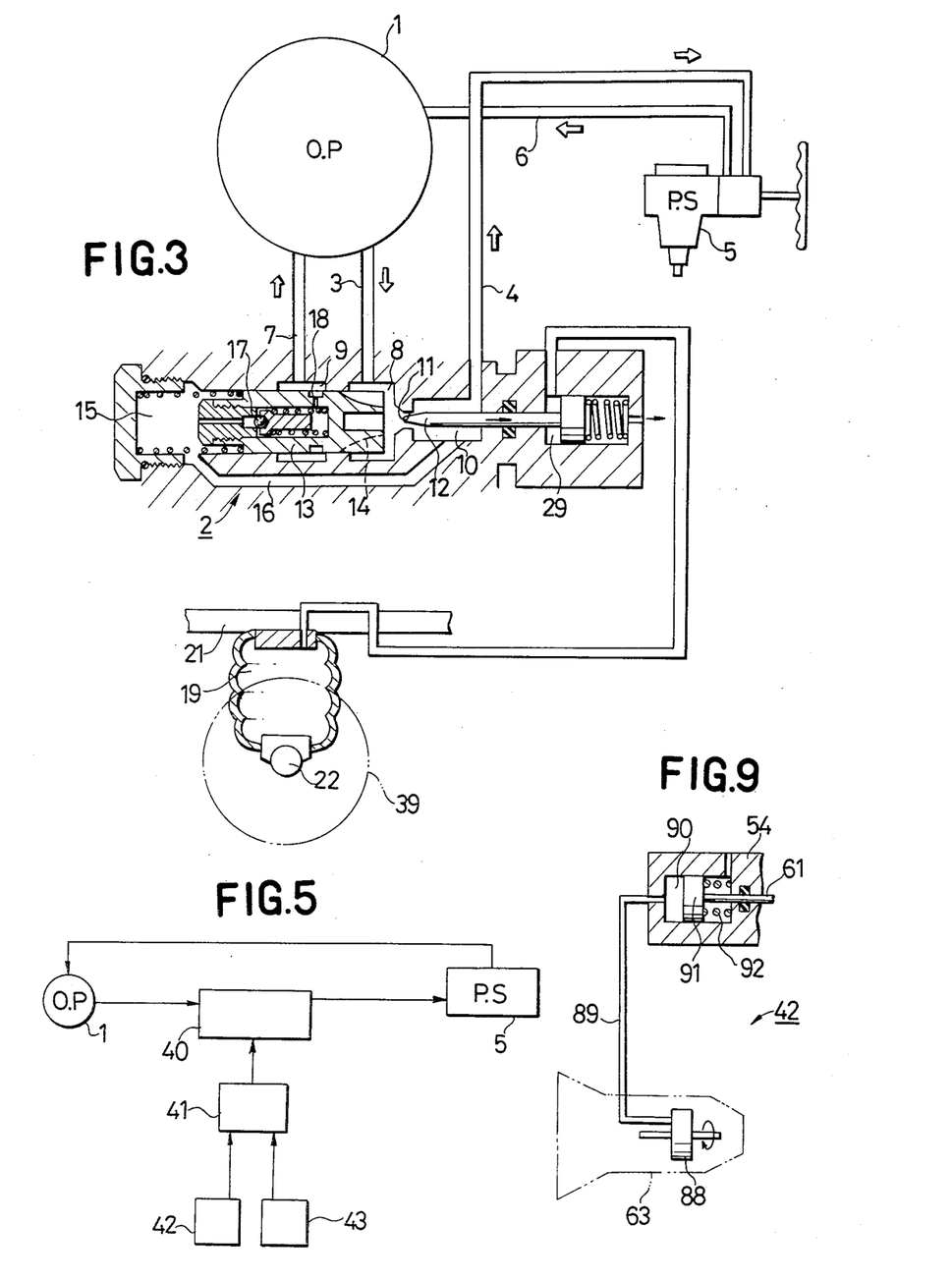
FIG. 5 is a fundamental block diagram of the whole control device of the present invention in which device the steering output is controlled by both vehicle speeds and vehicle loads.
FIG. 7 and FIG. 9 are, respectively, schematic illustrations of vehicle speed sensing mechanisms which are different from the mechanism shown in FIG. 6.

In FIGS. 2 and 3, other embodiments of vehicle load sensors are shown, which are different from the one shown in FIG. 1, while the structures of the flow control valve 2, pipings and so forth are the same as those of FIG. 1. Thus, the component members in FIGS. 2 and 3 which are the same as those in FIG. 1 are indicated by the same reference numerals. In the embodiment of FIG. 2, one end of a leaf spring 27 is pivotally secured to the uppermost end of a rod 26 which is perpendicularly attached to the wheel axle 22 of a vehicle. The leaf spring 27 itself is pivotally attached to a chassis frame 21 by means of a pin 28 and the other end of the leaf spring 27 is pivotally secured to the needle valve 12 of the flow control valve 2. In a loaded state wherein the chassis frame 21 moves nearer to the wheel axle 22, the leaf spring 27 and the needle valve 12 are shifted in the directions indicated by the arrows in the drawing.

In the embodiment shown in FIG. 3, an air cushion 19 is installed in the space between the chassis frame 21 and a wheel axle 22 and the pressure within the air cushion 19 is led into a chamber 29 that is formed in the housing of a flow control valve 2. When this pressure becomes large, that is, when the weight of a vehicle load is large, the needle valve 12 is shifted in the direction of the arrow. It will be clearly understood that these two embodiments increase the ratio of steering output of the power steering 5 when the weight of the load is large and thereby reducing the resistance in the operation of the steering wheel.

Figure 4:
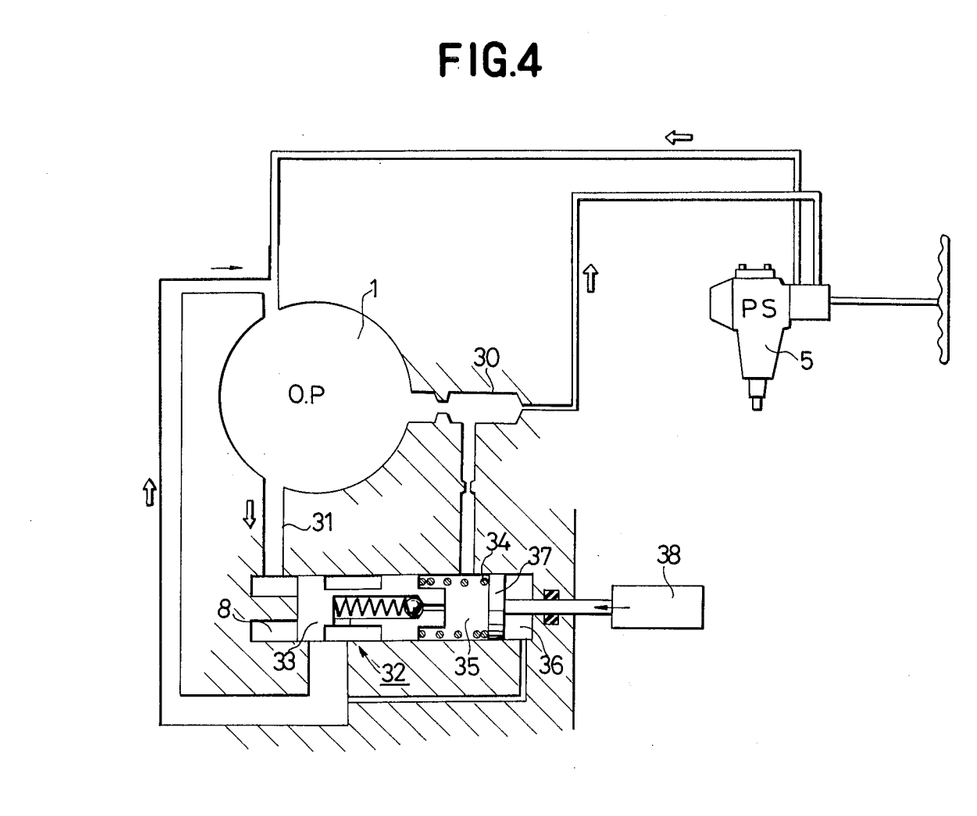
FIG. 4 is a partly cross-sectional schematic connection drawing showing a flow control valve of another type.

It is to be noted that the type of the flow control valve is, of course, not restricted to the above-described ones. For example, the flow control valve as shown in FIG. 4 in which the flow rate is controlled by regulating the set force of a valve spring 34 may be used. In this flow control valve, the fluid fed from an oil pump 1 is divided into two lines 30 and 31, in which one line 30 leads to a power steering 5 and the other line 31 leads to the flow control valve 32. The flow rate of the flow control valve 32 is varied by the force of the spring 34 which pushes a valve body 33 toward the valve seat, and also by the pressure difference between the chambers 35 and 8. Since the spring seat 37 of the spring 34 is moved by a plunger 38, when the spring seat 37 comes near to the valve body 33, the rate of controlled flow increases. Accordingly, if the spring seat 37 is moved toward the valve body 33 with the increase of a vehicle load, the flow rate to the power steering 5 increases and, accordingly, a large steering output can be obtained. The control of the shifting of spring seat 37, that is, the control of the plunger 38, may be performed by means of any one of an electric type as shown in FIG. 1, a mechanical type as shown in FIG. 2 or the pressure type as shown in FIG. 3. Thus the plunger 38 can be shifted in the direction of the arrow in FIG. 4 with the increase of a vehicle load.

In the following, another embodiment of the present invention will be described. In this embodiment, the steering power of a power steering device is controlled in response to vehicle speeds as well as vehicle loads. Such a device is shown in FIG. 5 in a fundamental connection drawing. In FIG. 5, the flow rate of the hydraulic oil delivered from an oil pump 1 is controlled in response to a vehicle speed and a vehicle load by a flow control valve 40 and the oil is supplied to the power steering 5. The hydraulic oil which is delivered from the power steering 5 is returned to the above oil pump 1. The reference numeral 41 designates a control section which controls the above flow control valve 40 in response to vehicle speeds and vehicle loads. The control section 41 receives the outputs of a speed sensing mechanism 42 to detect vehicle speeds and of a load sensing mechanism 43 to detect vehicle loads and it controls the flow control valve 40 in response to their outputs, thereby controlling the flow rate of the hydraulic oil from the oil pump 1 to the power steering 5. As a result, comfortable driving can always by attained.

As the above flow control valve 40, several kinds of well known flow control valves can be used.

Figure 6:
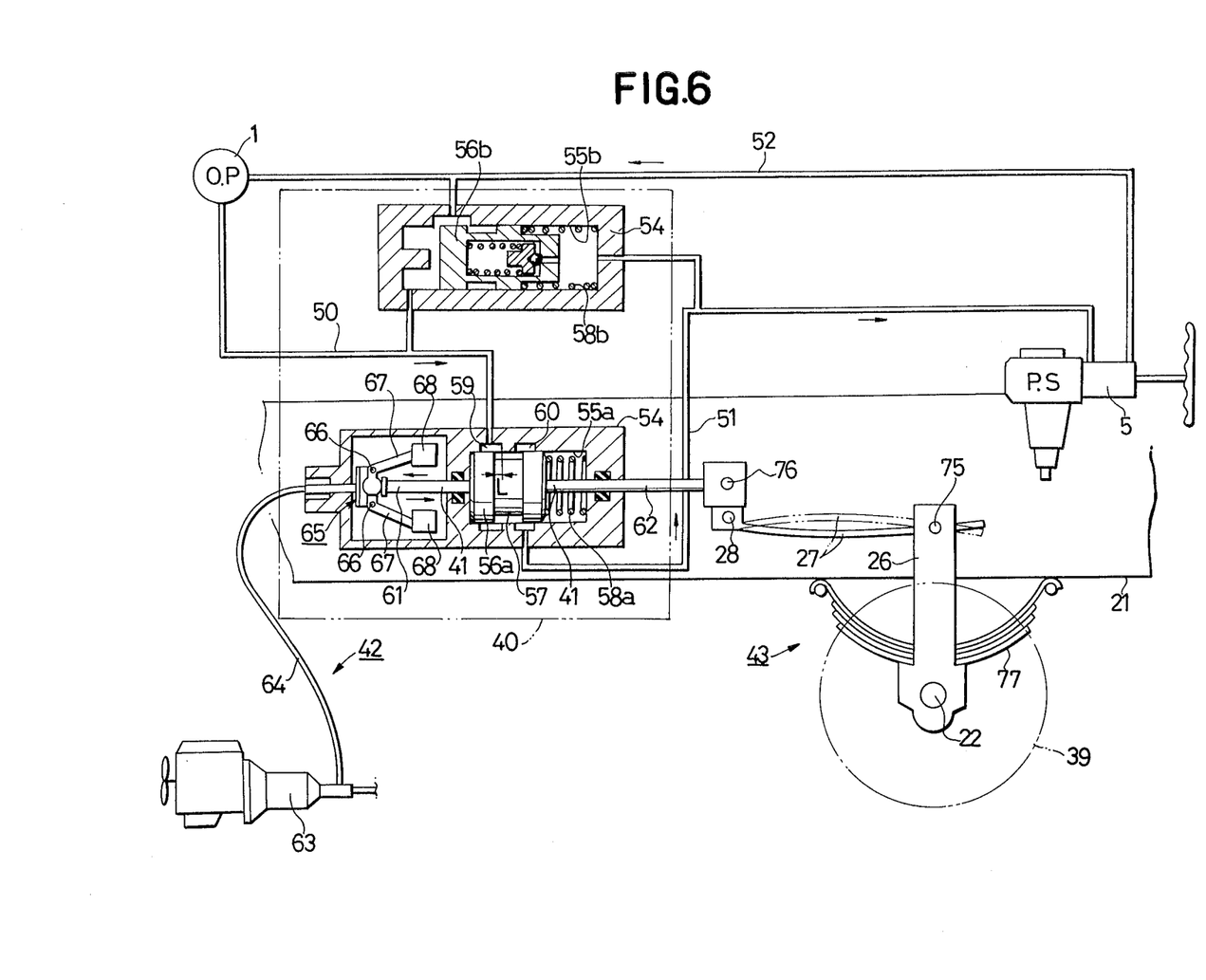
FIG. 6 is a partly cross-sectional connection drawing of the embodiment shown in FIG. 5.

In the embodiment shown in FIG. 6, a variable orifice type, that is, a throttle valve type is used as the flow control valve 40. In this embodiment, the hydraulic oil delivered from the oil pump 1 flows into the flow control valve 40 by way of a line 50 and then it flows into the working chamber of a power steering 5 through a line 51. The hydraulic oil is further returned to the oil pump 1 from the power steering 5 by way of a line 52.

The flow control valve 40 is provided with housings 54, and spool valves 56a and 56b are slidably installed in the bores 55a and 55b of the respective housings 54. In the outer surface of the spool valve 56a, an annular groove 57 is defined. In FIG. 6, the spool valve 56a is shifted leftward in a rest position by the force of a spring 58a which is also fitted in the bore 55a. A pair of other annular grooves 59 and 60 are formed in the inside wall of the bore 55a and, in the rest position of FIG. 6, the annular groove 57 communicates with both the annular grooves 59 and 60 with sufficient communication areas or flow passages. One annular groove 59 communicates with the line 50 and another annular groove 60 communicates with the line 51. Thus, the hydraulic oil delivered from the oil pump 1 can be supplied to the power steering 5 by way of the line 50, annular grooves 59, 57 and 60, and the line 51. In this state, the pressure difference between the front side and the rear side of the spool valve 56b is small and the spool valve 56b acts as a common flow control valve so that it is retained in the left position by the force of a spring 58b. Several mechanical means are used in this embodiment such as the control section 41 which controls the shifting of the spool valve 56a of the flow control valve 40, a vehicle speed sensing mechanism 42 and a vehicle load sensing mechanism 43 which transmit their outputs to the control section 41.

The control section 41 is disposed on both sides of the spool valve 56a and is composed of a pair of rods 61 and 62 which are slidably fitted to the housing 54.

The vehicle speed sensing mechanism 42 is composed of a rotary cable 64 and a centrifugal governor mechanism 65. The rotary cable 64 is connected to the drive shaft of a transmission 63 and the centrifugal governor 65 is driven by this rotary cable 64. The centrifugal governor 65 consists of a pair of arms 67 which are pivotally secured to the fulcrums of pins 66, and weights which are attached to the respective tip ends of the arms 67. When the centrifugal governor mechanism 65 is rotated by the rotary cable 64 in response to the rotation of the drive shaft of the transmission 63, that is, in response to the speed of a vehicle, the thrust generated in the centrifugal governor mechanism 65 is transmitted to the spool valve 56a by means of the rod 61 which connects the centrifugal governor machanism 65 and the spool valve 56a. The thrust of the centrifugal governor mechanism 65 is increased with the increase of vehicle speed and it shifts the spool valve 56a rightward.

The vehicle load sensing mechanism 43 is provided with a rod 26 which is fixed to a wheel axle 22 that supports a vehicle wheel 39. This rod 26 is connected to a leaf spring 27 by means of a pin 75 and the leaf spring 27 is pivotally secured to a chassis frame 21 by a pin 28. The leaf spring 27 is further connected to the above-mentioned rod 62 by means of a pin 76. This load sensing mechanism 43 is basically the same as the load sensing mechanism which is shown in the foregoing FIG. 2. The state shown in FIG. 6 is that of a maximum vehicle load and a low vehicle speed. When the vehicle load is decreased, the chassis frame 21 is moved apart from the wheel axle 22 by the force of a spring 77 so that the rod 26 connected to the wheel axle 22 is shifted downward relative to the chassis frame 21. Therefore, the leaf spring 27 which is connected to the rod 26 is turned clockwise about the pin 28 and the rod 62 which is connected to the spool valve 56a shifts the valve 56a rightward in response to the vehicle load.

In the following, the working of this embodiment will be described.

(I) When a vehicle speed is minimum and a vehicle load is maximum:

It is necessary in this case that the flow rate of fluid which is introduced into the working chamber of the power steering 5 must be sufficient to produce the maximum output because the resistance of steering operation becomes maximum. When the vehicle speed is low, the thrust of the centrifugal governor mechanism 65 to urge the spool valve 56a rightward is small. Further, when a vehicle load is large, the force to urge the spool valve 56a leftward by means of the rod 62 is large. As a result, the spool valve 56a is retained in the position of FIG. 6. Therefore, the overlapping L between the annular grooves 59 and 57, that is, the area of fluid passage becomes maximum.

In this state, the hydraulic oil which is fed to the annular groove 59 through the line 50 from the oil pump 1 flows into the annular groove 57 under almost no throttling action, and the hydraulic oil is further supplied into the working chamber of the power steering 5 by way of the annular groove 60 and the line 51. Therefore, the power steering 5 can exert its maximum output and the light steering operation can be realized without any steering resistance.

(II) When a vehicle speed is maximum and a vehicle load is minimum:

In this case, the steering resistance becomes minimum. Accordingly, it is necessary that the flow rate of the fluid that is supplied to the working chamber of the power steering 5 is minimum and the ratio of the output of the power steering 5 is also minimum. When the vehicle speed is maximum, the thrust of the centrifugal governor mechanism 65 becomes maximum so that the spool valve 56a is shifted rightward by the thrust and the area of the fluid passage between the annular grooves 59 and 57 is throttled. In addition, when the vehicle load is small, the rod 62 shifts the spool valve 56a rightward. Therefore, the above-mentioned area of the fluid passage between the annular grooves 59 and 57 and the flow rate of the fluid which is supplied into the working chamber of the power steering 5 become minimum. The excess oil is returned to the oil pump 1 by way of the spool valve 56b. Thus, in this case, the ratio of the output of the power steering 5 becomes minimum.

Accordingly, when the vehicle speed is high and the vehicle load is small which produces a minimum steering resistance, the operation of the steering wheel can be made relatively heavy and stable.

(III) In the case other than the above (I) and (II) such as when a vehicle speed is minimum and a vehicle load is also minimum, or when a vehicle speed is maximum and a vehicle load is also maximum:

In this case, the steering resistance becomes a medium value between the above maximum and minimum. When a vehicle speed is low, the force to shift the spool valve 56a rightward with the rod 61 is small, while, if a vehicle load is small, the rod 62 moves the spool valve 56a rightward to a large extent. In this function, the former rod 61 gives a resistance to the rightward movement of the spool valve 56a that is caused by the other rod 62, so that the distance of the rightward movement of the spool valve 56a becomes a medium value between the above cases of (I) and (II).

To the contrary, when a vehicle speed is high, the rod 62 largely pushes the spool valve 56a, however, since a vehicle load is large, the rod 62 pushes the spool valve 56a leftward. As a result, also in this case, the rightward movement of the spool valve 56a becomes a medium value.

When the influence of the weight of a vehicle load on the steering resistance is compared with the influence of the value of a vehicle speed on the steering resistance, it is considered that the influence of the vehicle speed is generally large. Therefore, the output of the vehicle speed sensing mechanism 42 is set to a slightly larger level than that of the vehicle load sensing mechanism 43. By such an arrangement, the displacement of the spool valve 56a can be properly controlled in response to both vehicle speeds and vehicle loads. Accordingly, the flow rate of the fluid which is introduced into the working chamber of the power steering 5 can be properly controlled and the output of the power steering 5 can also be controlled.

As will be understood from the above disclosure, since the working chamber of the power steering 5 is supplied with hydraulic pressures which are properly controlled in response to vehicle speeds and vehicle loads, comfortable steering feeling can always be obtained irrespectively of any vehicle speeds and vehicle loads.

In the embodiment shown in FIG. 6, both the vehicle speed sensing mechanism 42 and the vehicle load sensing mechanism 43 are mechanical means. However, one or both of them can be replaced with other sensing means such as electrical means and fluid pressure means.

Figures 7, 8:
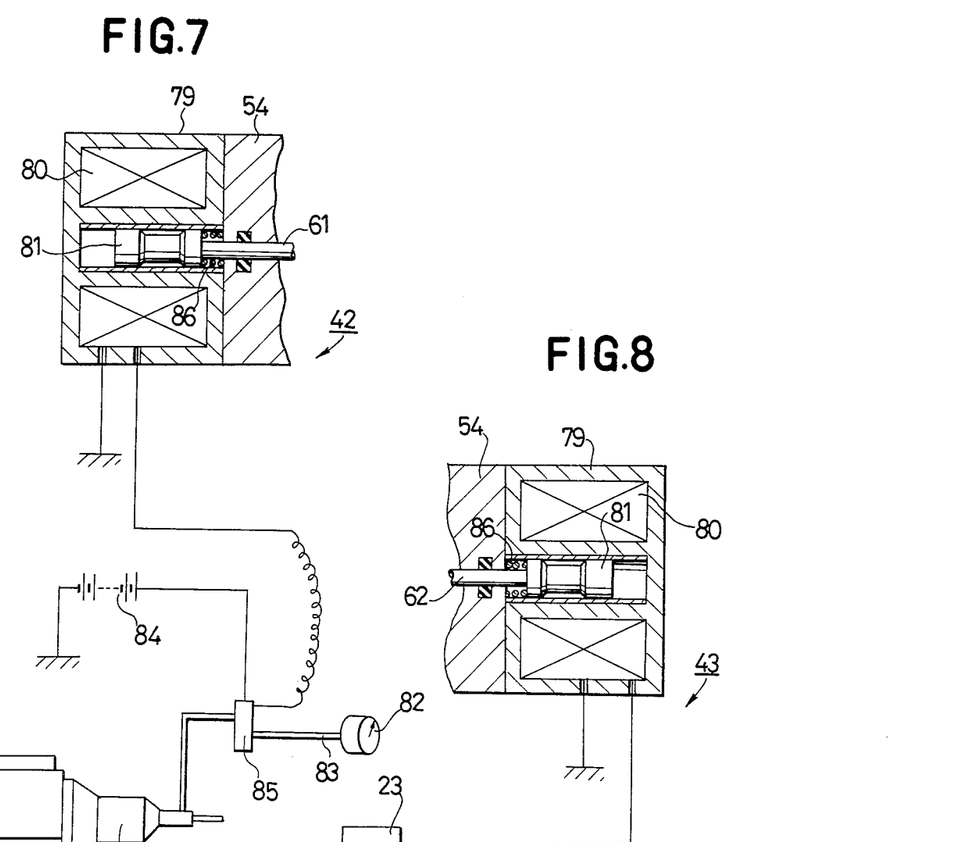
FIG. 8 and FIG. 10 are, respectively, schematic illustrations of load sensing mechanisms which are different from the mechanism shown in FIG. 6.

FIG. 7 shows an electrical speed sensing mechanism 42. A housing 79 which is formed integrally with the housing 54 of the flow control valve is provided with a solenoid 80. A plunger 81 is slidably inserted into the central bore of the solenoid 80. A control device 85 is attached to the midway of a rotary cable 83 of a speed meter 82, which cable 83 is connected to the drive shaft of the transmission 63. The control device 85 detects the rotational frequency of the rotary cable 83 and controls electric currents which are supplied to the solenoid 80 from storage batteries 84. The above plunger 81 is provided with the rod 61 which is connected to the spool valve 56a (see FIG. 6). In a low speed running, that is, when an electric current supplied to the solenoid 80 is small, the plunger 81 is shifted leftward by the force of a spring 86. When the electric current to the solenoid 80 is increased by the increase of the vehicle speed, the plunger is shifted rightward by electromagnetic force, thereby controlling the force applied to the spool valve 56a.

FIG. 8 shows an electric vehicle load sensing mechanism 43. The housing 79, solenoid 80, plunger 81 and spring 86 of the mechanism in this drawing are the same as those of the mechanism shown in FIG. 7. The reference numeral 20 denotes a displacement meter or a vehicle load sensor which is disposed in the space between a chassis frame 21 and a wheel axle 22 or a spring 77. The electric current which is supplied to the solenoid 80 from the storage batteries 84 is controlled by the load sensor 20 in response to vehicle loads or the variation of the distance between the chassis frame 21 and the wheel axle 22 or the spring 77. The above plunger 81 is urged toward the right side by the force of the spring 86 when a vehicle load is small. When the electric current supplied to the solenoid 80 is increased with the increase of the vehicle load, the plunger 81 is shifted leftward so that the spool valve 56a (see FIG. 6) which is connected to the plunger 81 by means of a rod 62, is also moved leftward. The reference numeral 23 denotes a filter which removes high frequency components just like that shown in FIG. 1.

Further, a hydraulic speed sensing mechanism 42 is shown in FIG. 9. An oil pump 88 which is attached to the drive shaft of a transmission 63 is connected, by way of a line 89, to a chamber 90 which is formed in the housing 54 of the pressure control valve. A rod 61 is connected to a piston 91 which forms the chamber 90 and the piston 91 is urged leftward by a spring 92. When the pressure in the oil pump 88 is raised with the increase of vehicle speed, the pressure is introduced into the chamber 90 by way of a line 89, thus, the spool valve 56a (see FIG. 6) is shifted by means of the piston 91 and the rod 61.

Figures 10, 12:
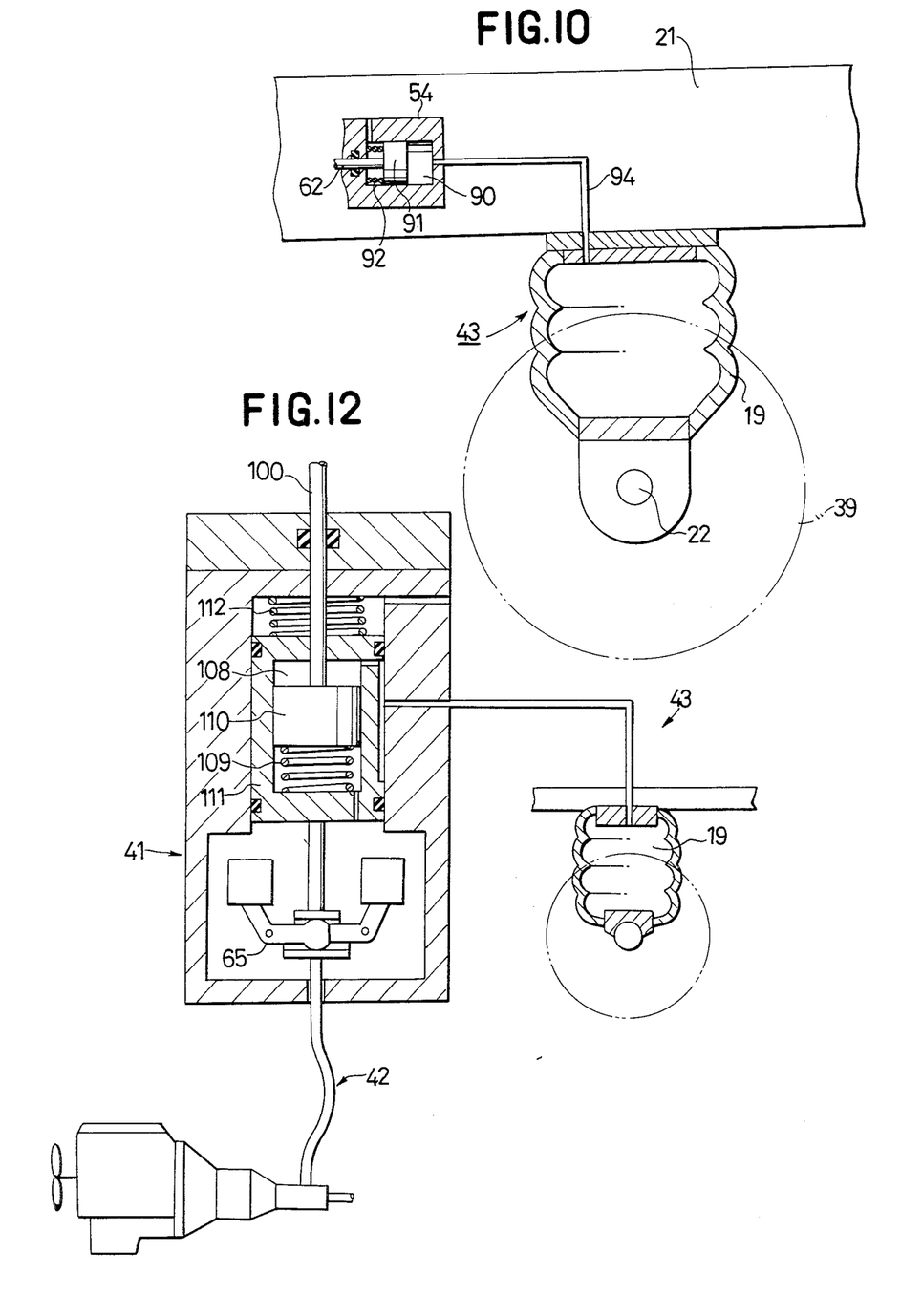
FIG. 12 is a cross-sectional view of a control device which is different from the device shown in FIG. 11.

Shown in FIG. 10 is a pneumatic load sensing mechanism 43. In the case that wheel axles 22 are supported by air cushions 19, the variation of air pressure in a air cushion 19 can be utilized. The pressure in the air cushion 19 is introduced into a chamber 90 by way of a line 94, which chamber 90 has the same structure as that of FIG. 9. Of course, the piston 91 is connected to the rod 62 of the flow control valve 40 as shown in FIG. 6.

It may be clear that, when the above-described several speed sensing mechanisms 42 and load sensing mechanisms 43 are combined with the embodiment as shown in FIG. 6, substantially the same functions can be attained.

Figure 11:
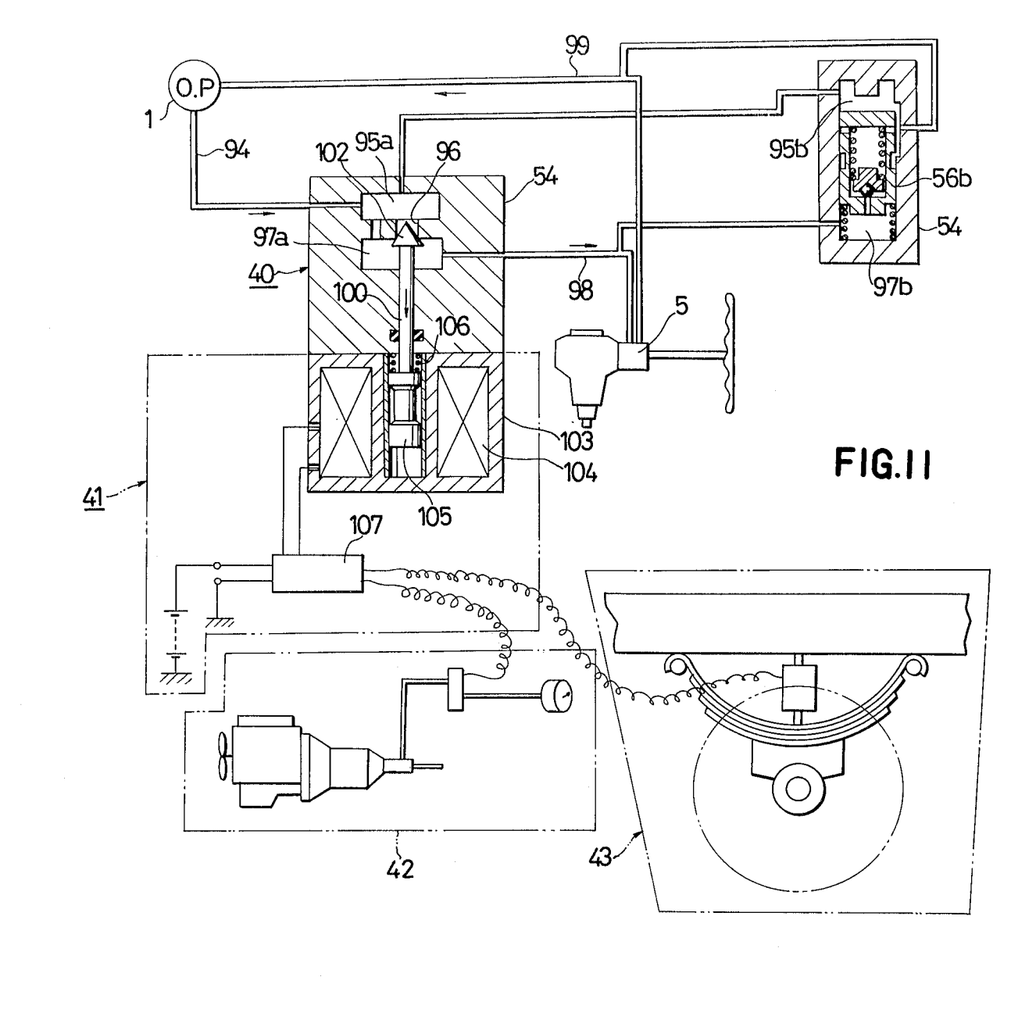
FIG. 11 is a partly cross-sectional connection drawing of another embodiment of the present invention.

Another embodiment of the present invention is shown in FIG. 11, in which the flow control valve 40 thereof is a variable orifice type which is different from the foregoing embodiments.

In this embodiment, the hydraulic oil delivered from an oil pump 1 is led into the working chamber of a power steering 5 by way of a line 94, a chamber 95a that is formed in the housing 54 of the flow control valve 40, an orifice 96, another chamber 97a and a line 98, and the hydraulic oil is then returned to the oil pump 1 by way of a line 99. An upper chamber 95b of a spool valve 56b is communicated with the above-mentioned chamber 95a and a chamber 97b is also communicated with the chamber 97a. The spool valve 56b serves as a common flow control valve. The housing 54 is provided with a poppet valve 100 which is movably directed from the chamber 97a into the orifice 96. By the displacement of this poppet valve 100, the area of the fluid passage between the chambers 95a and 97a is controlled so as to vary the flow rate of the fluid supplied to the working chamber of the power steering 5.

Also in this flow control valve 40 using a poppet valve 100, when the poppet valve 100 is controlled by the rods which correspond to the rods 61 and 62 of the embodiment in FIG. 6, the above-described several speed sensing mechanisms 42 and load sensing mechanisms 43 can be employed as they stand. However, in this embodiment, the control section 41 to control the poppet valve 100 of the pressure control valve 40 is actuated by electrical control. Accordingly, the speed sensing mechanism 42 and the load sensing mechanism 43 are electrical means which are similar to the foregoing electric type mechanisms.

The above control section 41 is provided with a solenoid 104 which is formed in a housing 103 that is connected to the housing 54 of the flow control valve 40, a plunger 105 which is slidably inserted into the central bore of the solenoid 104, and a spring 106 which urges the plunger 105 in the downward direction. The poppet valve 100 is connected to the plunger 105 and it is normally retained in the downward position by the force of the spring 106, in which the area of the fluid passage between the chambers 95a and 97a is made maximum. The reference numeral 107 denotes a control circuit which controls the electric current that is supplied to the solenoid 104. The control circuit 107 receives the signals from the speed sensing mechanism 42 and the load sensing mechanism 43 and transmits electric currents in response to vehicle speeds and vehicle loads to the solenoid 104.

Since the above-described speed sensing mechanism 42 and load sensing mechanism 43 constitute an electric control section 41 which is different from the foregoing mechanical ones, the mechanisms belonging to the parts of the solenoids 80 of both mechanisms 42 and 43 as shown in FIGS. 7 and 8 are omitted.

As will be understood from the above embodiment, in order to achieve a comfortable steering feeling always, the poppet valve 100 is shifted to the lowermost position also in this embodiment when a vehicle speed is minimum and a vehicle load is maximum, while, the poppet valve 100 is shifted to the uppermost position when a vehicle speed is maximum and a vehicle load is minimum. In the cases other than the above, the poppet valve 100 is placed in an intermediate position in response to the values of vehicle speeds and vehicle loads.

In order to satisfy this requirement, the output of the above vehicle speed sensing mechanism 42 is so set as to increase with the rise of a vehicle speed and the output of the vehicle load sensing mechanism 43 is so set as to increase with the decrease of a vehicle load. The control circuit 107 adds the outputs of both the mechanisms 42 and 43 and it supplies electric currents to the solenoid 104 in response to the added value. Accordingly, when a vehicle speed is minimum and a vehicle load is maximum, the output of the control circuit 107 becomes minimum so that the poppet valve 100 is shifted to the lowermost position by the force of the spring 106, the area of fluid passage between the chambers 95a and 97a becomes maximum, and the output of the power steering 5 becomes also maximum. To the contrary, when a vehicle speed is maximum and a vehicle load is minimum, the output of the control circuit 107 becomes maximum, the fluid passage between the chambers 95a and 97a is throttled to the minimum value by the poppet valve 100, and the output of the power steering 5 becomes minimum.

In the above embodiment, the outputs of the speed sensing mechanism 42 and the load sensing mechanism 43 are electrically added together by the control section 41 so as to control the position of the poppet valve 100. A similar consideration can be applied to the mechanical control section.

FIG. 12 shows an embodiment of such a system, in which a centrifugal governor mechanism 65 as a speed sensing mechanism 42 and an air cushion 19 as a load sensing mechanism 43 are combined. Of course, other combinations are possible. The output of the load sensing mechanism 43 is introduced into a chamber 108 as a pneumatic pressure and it pushes down a piston 110 against the force of a spring 109. A poppet valve 100 is connected to this piston 110, accordingly in like manner as the case of the electric control section 41, also in this mechanical control section 41, the poppet valve 100 is shifted downward with the increase of the vehicle load. The output of the speed sensing mechanism 42, that is, the thrust of the centrifugal governor mechanism 65, is transmitted to the cylinder 111 which holds the above piston 110. The cylinder 111 is raised against the force of the spring 112 with the increase of the vehicle speed. As a result, the poppet valve 100 is shifted to the lowermost position when a vehicle speed is minimum and a vehicle load is maximum, and the poppet valve 100 is shifted to the uppermost position when a vehicle speed is maximum and a vehicle load is minimum.

Figure 13:
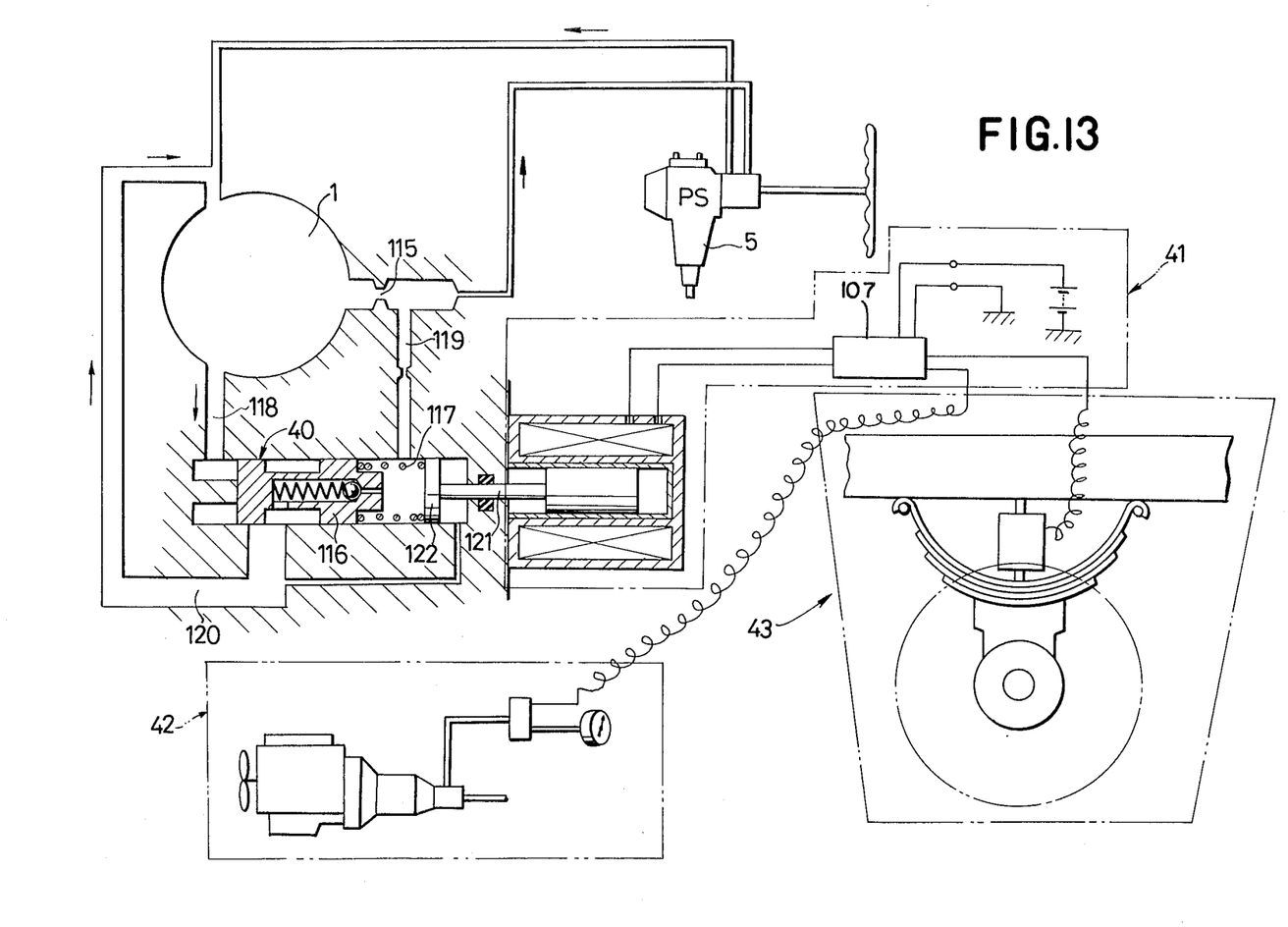
FIG. 13 is a partly cross-sectional connection drawing of a further embodiment of the present invention.

FIG. 13 shows another embodiment in which a flow control valve 40 of another type is used. In this flow control valve 40, when the quantity of discharged oil from the oil pump 1 exceeds a certain level, a part of the discharged oil is returned to the suction side of the oil pump 1 and after that, even when the delivery rate of the oil pump 1 is increased, the supply of oil to the power steering 5 is maintained at a constant value. In this embodiment, the set force of the spring of the flow control valve 40 is varied by, for example, the mechanism as shown in FIG. 11.

The hydraulic oil which is delivered from the oil pump 1 is supplied to the working chamber of the power steering 5 by way of an orifice 115 and the hydraulic oil is further returned to the oil pump 1. The valve body 116 of the flow control valve 40 is retained by the force of a spring 117 at the position as shown in the drawing. One end face of the valve body 116 is supplied with the delivery pressure of the oil pump 1 by way of a passage 118 and the other end face of the valve body 116 is supplied with a reduced pressure by way of the orifice 115 and a passage 119. Accordingly, when the pressure difference exerted to the valve body 116 is increased with the increase of the discharge of the hydraulic oil, the valve body 116 is shifted rightward against the force of the spring 117. Thus, the passage 118 is communicated with a passage 120 so that a part of the delivered oil is circulated. The area of the fluid passage between the passages 118 and 120 is controlled by the displacement of the valve body 116 which is moved according to the pressure difference between the front side and the rear side of the orifice 115. Therefore, the quantity of oil which is supplied to the power steering 5 from the oil pump 1 is maintained at a constant level.

Meanwhile, the control section 41 which receives the outputs of the speed sensing mechanism 42 and the load sensing mechanism 43, controls the force of the spring 117 by means of a rod 121 and a spring seat 122.

Accordingly, when a vehicle speed is low and a vehicle load is large, the force of the spring 117 is increased so as to suppress the opening of the valve body 116 and to supply more oil to the power steering 5, thereby obtaining a sufficient output of the power steering 5. When a vehicle speed is high and a vehicle load is small, the force of the spring 117 is decreased so as to reduce the oil supply to the power steering 5 by opening the valve body 116, thereby decreasing the output of the power steering 5. Further, in place of the common flow control valve used herein, when a flow control valve in which the controlled flow rate is decreased with the increase of an incoming flow rate is used, a power steering which increases the steering power during high speed running, can be obtained.

In the above-described embodiments, the vehicle wheel to attach the vehicle load sensor is not restricted. Accordingly, the sensing of vehicle loads may be attained by any of front wheels and rear wheels. However it is preferable, in view of the object of the present invention, that the vehicle loads are detected by means of a vehicle wheel for steering, that is, generally a front wheel. It is possible that a vehicle load is detected only one time, for example, when the engine is started without performing continuous sensing and the regulation of the power steering is carried out with such a detected value. In such a case, the vehicle load sensor is not directly connected to the fluid pressure control means and, by reading the value, the fluid pressure control means may be regulated manually so as to control the power steering with the vehicle load. When a continuous type load sensor is used, the afore-mentioned filter to eliminate high frequency components is used. In addition, vehicle loads can be detected by using a load sensing means of lower sensitivity or lower responding character, or by using a buffer to eliminate the shocks of loads.

Further, the power steerings are classified according to their substantial structures into those using spool valves, those using rotary valves and those using flapper valves. However, the present invention may be applied to any type of these power steerings. In the above-described embodiments, the pressure control valves are separately formed from the oil pumps 1 and power steerings 5 for the convenience of illustration. However, it is to be noted that the pressure control valves can be previously mounted in the bodies of power steerings 5 or oil pumps 1.

Lastly, it should be emphasized that the above specific examples are intended as merely illustrative and are in no way restrictive of the invention. It is preferred, therefore, that the present invention be limited not by the specific disclosure therein, but only by the appended claims.

What is claimed is:

1. In a steerable vehicle having a steering wheel, a steering power control device for a power steering system which comprises an oil pump, a power steering apparatus which exerts an auxiliary force to the steering power of the steering wheel, a vehicle load sensing means which produces an output in response to a vehicle load, a flow control means connected for actuation in response to the output of said vehicle load sensing means, said flow control means being connected between said oil pump and said power steering apparatus, said flow control means comprising a throttle valve mechanism which throttles the fluid passage connected from said oil pump to said power steering apparatus and a recycle passage which returns excess fluid from said flow control means to said oil pump so that the flow rate of the fluid which is supplied to said power steering apparatus from said oil pump is increased by said flow control means when said vehicle load is large.

2. The steering power control device for a power steering system as claimed in claim 1, wherein said vehicle load sensing means is an electric sensor which produces a variable electrical output in response to variation of the distance between the vehicle wheel axle and the vehicle chassis, a solenoid connected to receive said electrical output, said solenoid being connected to said flow control means for actuating same.

3. The steering power control device for a power steering system as claimed in claim 1, wherein said vehicle load sensing means is a pressure sensor which produces a variable pressure output in response to variation of the distance between the vehicle wheel axle and the vehicle chassis frame, said flow control means including pressure operated means connected to receive said variable pressure output whereby said flow control means is operated by said variable pressure output.

4. The steering power control device for a power steering system as claimed in claim 1, wherein said vehicle load sensing means is a mechanical sensor which bends a spring in response to variation of the distance between the vehicle wheel axle and the vehicle chassis, said flow control means being connected to said spring for actuation in response to bending of said spring.

5. The steering power control device for a power steering system as claimed in claim 1, claim 2, claim 3 or claim 4, wherein said vehicle load sensing means detects the load which is exerted on a steering vehicle wheel.

6. The steering power control device for a power steering system as claimed in claim 1 including a vehicle speed sensing means which produces a second output in response to the vehicle speed, a control section for controlling said flow control means, said control section being connected for receiving said output from said vehicle load sensing means and said second output from said vehicle speed sensing means so as to reduce the steering power when the vehicle load becomes large and when the vehicle speed becomes low.

7. The steering power control device for a power steering system as claimed in claim 1, wherein said vehicle load sensing means is an electric sensor which produces an electrical output in response to vehicle load and said flow control means is operated by a solenoid which receives said electrical output.

8. The steering power control device for a power steering system as claimed in claim 6, wherein said vehicle speed sensing means is composed of a centrifugal governor mechanism and said flow control means is operated by the stem of a valve which stem is longitudinally moved by said centrifugal governor mechanism.

9. The steering power control device for a power steering system as claimed in claim 6, wherein said vehicle load sensing means and said vehicle speed sensing means are respectively composed of electric sensors and said flow control means is operated by the combined outputs of both said sensors.

10. The steering power control device for a power steering system as claimed in claim 6, wherein said vehicle load sensing means and said vehicle speed sensing means are respectively composed of pressure sensors or mechanical sensors and the outputs of both the sensors are applied to the stem of a valve which constitutes said flow control means.

11. In a steerable vehicle having a steering wheel, a steering power control device for a power steering system which comprises an oil pump, a power steering apparatus which exerts an auxiliary force to the steering power of the steering wheel, an electric sensor which produces a variable electrical output in response to variation of the distance between the vehicle wheel axle and the vehicle chassis so that said electrical output is responsive to vehicle load, a filter for removing high frequency components in said electrical output when the vehicle is running on a curved or rugged road, a solenoid connected to receive said electrical output from said filter, a flow control means connected to said solenoid for actuation by said solenoid, said flow control means being connected between said oil pump and said power steering apparatus so that the flow rate of the fluid which is supplied to said power steering apparatus from said oil pump is increased by said flow control means when said vehicle load is large.

* * * * *

UNITED STATES PATENT AND TRADEMARK OFFICE
CERTIFICATE OF CORRECTION

PATENT NO. : 4 216 841
DATED : August 12, 1980
INVENTOR(S) : Tadao Ohtuka et al

It is certified that error appears in the above-identified patent and that said Letters Patent are hereby corrected as shown below:

Change name of Assignee "Jidosha Kika Co., Ltd." to
---Jidosha Kiki Co., Ltd.---.

Column 13, line 43; change "claim 1" to ---claim 6---.

Signed and Sealed this

Eighteenth Day of November 1980

[SEAL]

Attest:

SIDNEY A. DIAMOND

Attesting Officer    Commissioner of Patents and Trademark: